United States Patent [19]
Richard

[11] 3,780,695
[45] Dec. 25, 1973

[54] WORK SCHEDULING APPARATUS

[76] Inventor: Willard H. Richard, 42865 Jefferson St., Fremont, Calif. 94538

[22] Filed: Aug. 4, 1971

[21] Appl. No.: 168,889

[52] U.S. Cl. ................................. 116/136, 40/19.5
[51] Int. Cl. ............................................ G08b 5/00
[58] Field of Search ..................... 116/DIG. 28, 136, 116/133, 128, 130; 40/19 A, 19.5; 35/24 A, 24 B; 325/393; 273/136 C; 248/205 R

[56] References Cited
UNITED STATES PATENTS

| | | | |
|---|---|---|---|
| 393,806 | 12/1888 | Abercrombie | 116/133 |
| 728,866 | 5/1903 | Childress | 116/133 |
| 773,749 | 11/1904 | Kaplan | 116/133 |
| 1,665,568 | 4/1928 | Spiegel | 116/136 |
| 2,062,259 | 11/1936 | Thomas | 325/393 |
| 2,476,257 | 7/1949 | Hoff | 116/114 R |
| 2,509,659 | 5/1950 | Wassell | 116/135 |
| 2,575,269 | 11/1951 | Hall | 116/136 |
| 2,794,642 | 6/1957 | O'Neill | 116/136 X |
| 3,500,557 | 3/1970 | White | 35/24 A |
| 3,645,227 | 2/1972 | Lahmer | 116/128 |

*Primary Examiner*—Louis J. Capozi
*Attorney*—Boniard I. Brown

[57] ABSTRACT

Work scheduling apparatus for scheduling and monitoring the status of a number of tasks specified by work orders and performed by operators which may be persons or machines. The apparatus includes a work scheduling board having timing means for indicating elapsed time and an array of work scheduling positions arranged in horizontal and vertical rows for selectively receiving coded markers representing the different tasks which may be specified by the work orders. One set of the parallel position rows are designated by indicia representing the different work operators, and the remaining rows and the markers are designated by indicia representing the several work orders to be executed and estimated task completion times. In use, the task markers are placed in the board positions in such a way that each marker indicates the estimated completion time of a designated task of a designated work order and the work operator who is to perform the task. The markers representing the tasks currently being performed by the operators are illuminated in a unique way so that the work scheduler may quickly determine by observation of the board the current status of each operator and task.

17 Claims, 11 Drawing Figures

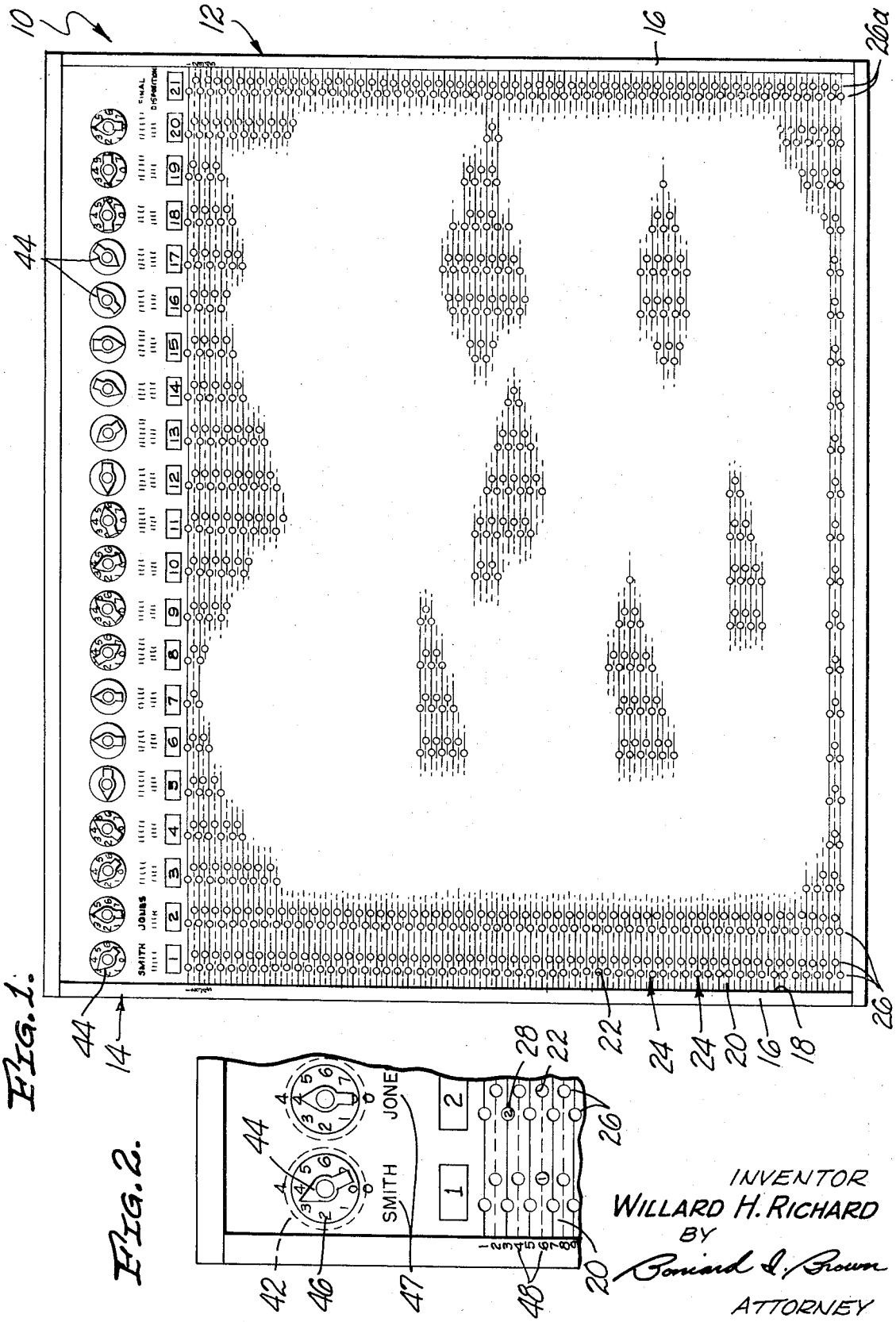

PATENTED DEC 25 1973 3,780,695
SHEET 2 OF 4
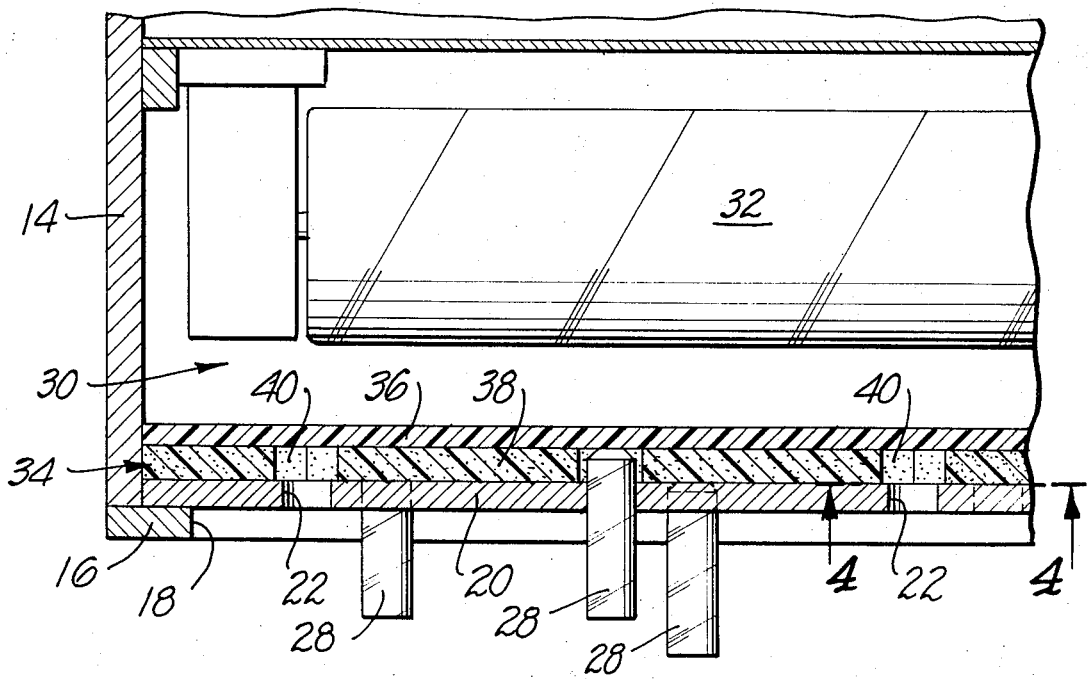
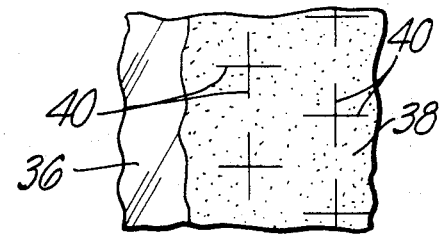
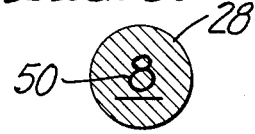
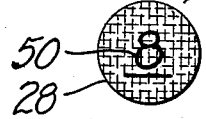
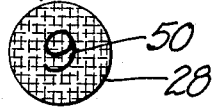
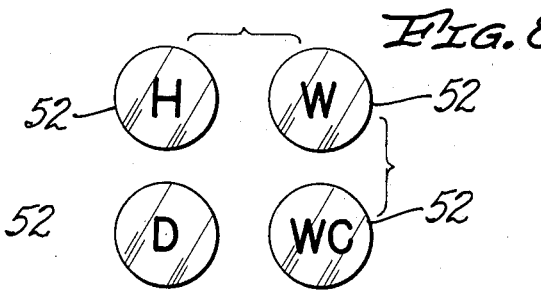
INVENTOR
WILLARD H. RICHARD
BY
Bernard S. Brown
ATTORNEY

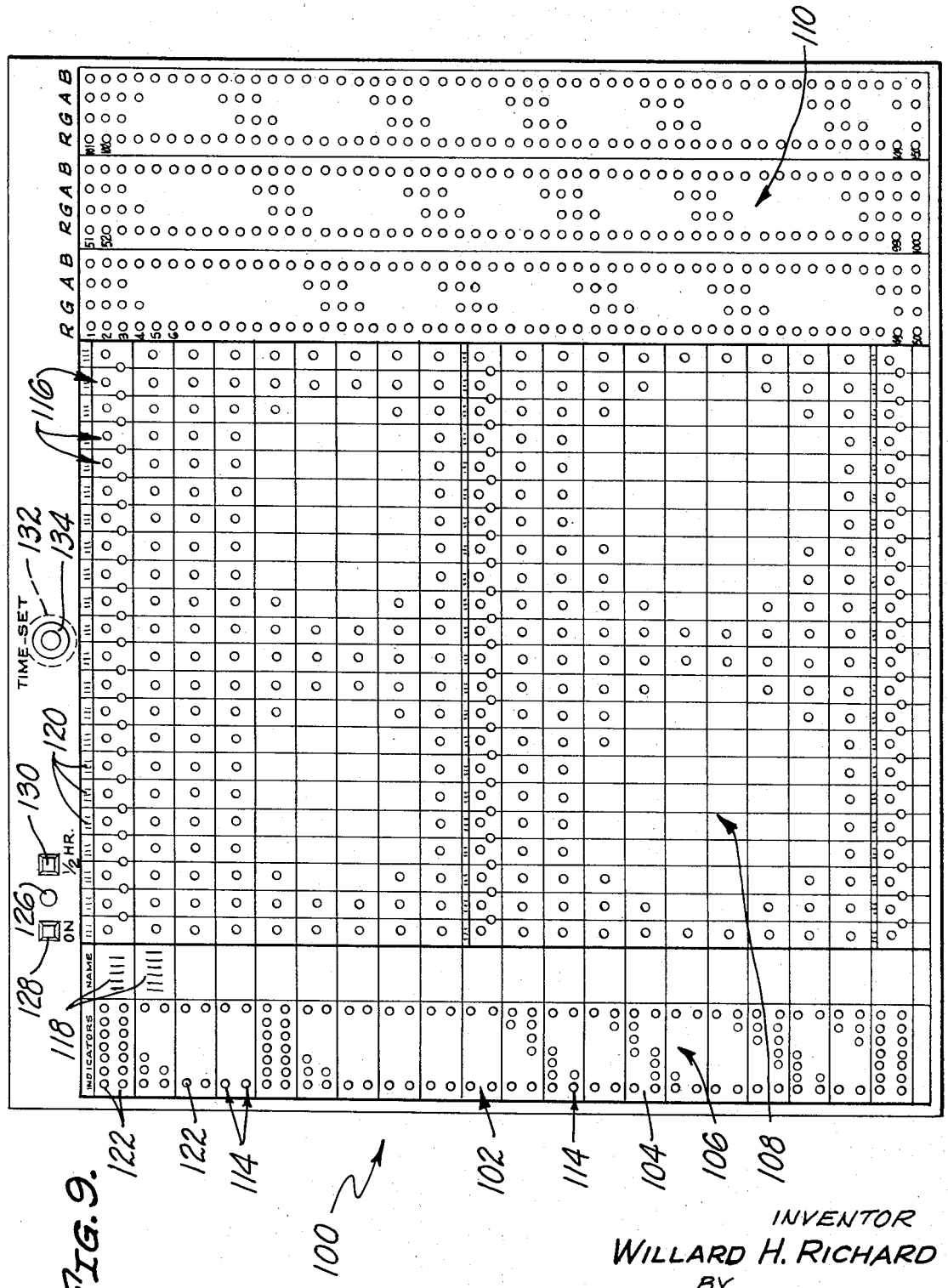

INVENTOR
WILLARD H. RICHARD
BY
ATTORNEY

WORK SCHEDULING APPARATUS

BACKGROUND OF THE INVENTION

1. Field of the Invention

This invention relates generally to the field of scheduling and monitoring the status of a number of tasks specified by work orders and being performed by different operators. More particularly, the invention relates to a novel work scheduling apparatus for aiding such work scheduling and monitoring.

2. Discussion of the Prior Art

As will appear from the ensuing description, the work scheduling apparatus of the invention may be employed for a wide variety of work scheduling and monitoring applications. In this regard, it is significant to note at the outset that in the context of the present disclosure, the term "operator" is intended to encompass both persons and machines for performing specified tasks. A primary application of the invention, however, involves scheduling and monitoring the status of the daily automotive service and repair facility which employs a relatively large number of mechanics each of whom performs a specified task or certain specified tasks. The invention will be disclosed in connection with this particular application.

Most if not all new car dealers maintain large service facilities for servicing and repairing automobiles. Such a facility requires the employment of a relatively large number of mechanics who are skilled in the various facets of automobile servicing and repair. In order to assure continued profitable operation of the facility, the various jobs to be done each day must be assigned to the proper mechanics, that is scheduled, in such a way as to keep the mechanics constantly busy without creating bottlenecks in the flow of work to the shop.

At the present time, when a customer enters an automobile service facility, he is met by a foreman who makes a record of the various jobs which the customer wishes to have done. These jobs are then assigned to the appropriate mechanics for performance in the order in which they arrive at the shop. Servicing and/or repair of a given car, of course, may and generally does require the services of two or more mechanics having different expertise. As a consequence, a substantial problem is involved in assuring continuous flow of work to the various mechanics in the proper order and timing to keep each mechanic busy at all times.

SUMMARY OF THE INVENTION

The work scheduling apparatus of the invention includes a work scheduling board and a number of markers coded to represent different tasks which may be specified by work orders. The scheduling board has an array of work scheduling positions arranged in horizontal and vertical rows for selectively receiving the markers. One set of parallel position rows, i.e., either the horizontal rows or the vertical rows, are designated by indicia representing the work operators who perform the various tasks specified by work orders. The remaining rows and the task markers are designated by indicia representing different work orders and estimated task completion times. Mounted on the board are timing means for indicating elapsed time.

In use, the work scheduler places the task markers on the board in such a way that each marker indicates the estimated completion time of a specified task of a specified work order and the work operator who is to perform the task. The markers representing the tasks currently being performed by the work operators are illuminated in a unique way so that the work scheduler may quickly determine by observation of the board the status of each operator and task. Tasks may thus be assigned to the operators in an expeditious manner which permits completion of a maximum number of tasks during each work shift.

Two inventive embodiments are disclosed. Each has a scheduling board with holes in its scheduling positions and the task markers comprise pegs to be inserted in the holes. These pegs are transparent and have different colors representing the different tasks which may be specified by a work order. The board is equipped with unique illumination means for illuminating each peg from the rear when the peg is depressed from a forward position to a rearward position in its containing hole. The light is transmitted through the peg to its front face so that each illuminated peg is readily visible from the front of the board. The pegs are initially placed in their forward positions in the scheduling board wherein the pegs are dark. When the board indicates that an operator is starting a new task assigned to him, the corresponding peg is depressed to illuminate the peg. The peg representing the task, if any, just completed by the operator is removed from the board.

The illustrated embodiments are intended for use in an automotive servicing and repair facility. In this application, the indicia on the scheduling board representing the work operators are mechanics' names. The work orders are the numbered job orders which are completed to indicate the various servicing and/or repair jobs which are to be performed on the customers' automobiles. The work order indicia on the board are the job order or log numbers.

In one disclosed embodiment, the horizontal position rows on the scheduling board are designated by successive job order numbers and the vertical rows by the mechanics' names. Each vertical mechanic's row has a timer which the work scheduler or dispatcher sets, when the corresponding mechanic commences a new job, to the estimated total completion time for the job. This timer then indicates the estimated remaining time required for the mechanic to complete his current job. Each peg has indicia representing a particular hour or half hour. When scheduling a job, the dispatcher selects the job peg which indicates the correct estimated time of completion of the job, and places the peg in the board at the position of intersection of the appropriate job order number row and mechanic's row. The work scheduling apparatus also includes pegs and holes in the scheduling board for indicating the final disposition of each automobile.

In the other disclosed embodiment, the horizontal position rows on the scheduling board are designated by mechanics' names and the vertical rows by successive clock times in one-half hour intervals. Each peg has a work or job order number. The board has a timer which indicates elapsed time in preselected intervals, such as half hour intervals. In this embodiment, when scheduling a job, the dispatcher selects the job peg having the correct job order number and places the peg on the board at the position of intersection of the appropriate mechanic's row and estimate job completion time row. This embodiment is also equipped with mechanics' pegs for quickly indicating which mechanic is currently working on each job order.

BRIEF DESCRIPTION OF THE DRAWINGS

FIG. 1 is a front view of a present work scheduling board.

FIG. 2 is a fragmentary enlargement of the board;

FIG. 3 is an enlarged section through the board;

FIG. 4 is an enlarged section on line 4—4 in FIG. 3;

FIG. 5 is an enlargement of one job marker or peg for the board;

FIGS. 6 and 7 are end views of the pegs illustrating the estimated job completion time indicia on the pegs;

FIG. 8 is end views of certain customer card disposition pegs used on the board;

FIG. 9 is a front view of a modified work scheduling board according to the invention;

DESCRIPTION OF THE PREFERRED EMBODIMENTS

Figure 10:
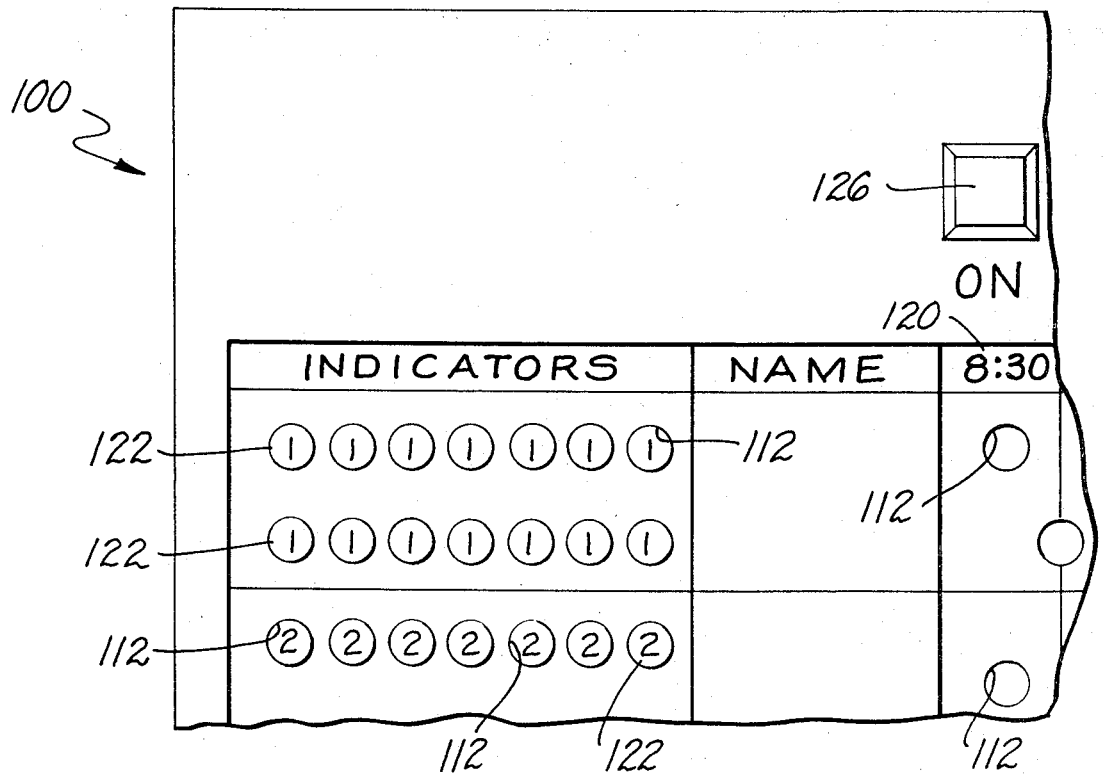
FIG. 10 is a fragmentary enlargement of the board illustrating certain mechanic indicator pegs which are used on the board.

The work scheduling apparatus 10 illustrated in FIGS. 1-8 has a hollow work scheduling board 12 including a rectangular frame 14 with a front inwardly directed flange 16 defining a rectangular face opening 18. Extending across the opening and seating against the rear side of the flange 16 is an opaque face plate 20. This face plate has a multiplicity of work scheduling positions 22 each comprising a hole through the face plate. The work scheduling positions or holes 22 are arranged in horizontal rows 24 and vertical rows 26. Holes 26 receive markers 28 in the form of pegs which are coded to represent different tasks to be performed, as will be explained presently.

Scheduling board 12 includes illumination means 30 for selectively illuminating the pegs 28. The illumination means comprises a light source 32 within the board at the rear of the face plate 20. Between the plate and light source is a light shutter assembly 34 for passing light from the source to the rear end of any selected peg 28 on the board. The pegs are constructed of a transparent plastic, such that any peg which is illuminated from the rear transmits the light to the front side of the board. The illuminated pegs are thus clearly visible from the front side of the work scheduling board.

The illustrated shutter assembly 34 comprises a transparent plate 36, preferably a translucent light diffusion plate, between the face plate 20 and light source 32. Between the plates 20, 36 is an opaque resiliently compliant sheet 38 of foam rubber or other suitable material. This sheet has a pair of normally closed intersecting slits 40 opposite the rear end of each face plate hole 22. Each slit pair forms a normally closed light shutter means which is opened to pass light to a peg 28 in the adjacent face plate hole 22 by depressing the peg rearwardly from the forward extended position to its rearward retracted position of FIG. 3.

In connection with this shutter operation, it will be observed in FIG. 3 that the rear end of each peg in forward extended position seats against the front side of the resilient sheet 38. The corresponding shutter slits 40 are then closed to block the passage of light to the peg. When the peg is depressed rearwardly by finger pressure, the rear beveled end of the peg is forced through the slits to its rearward retracted position wherein the rear end of the peg seats against the transparent plate 36. Light from the light source 32 is then transmitted forwardly through the peg to illuminate the latter at the front side of the board 12, as explained earlier. Return of the peg to its forward extended position or withdrawal of the peg permits the slits to reclose and block light passage to the peg or peg hole, as the case may be.

Mounted on the face plate 20 at the upper end of each vertical row 26 of face plate holes 22 is a conventional presettable timer 42 with a rotatable time presetting knob 44 and a time scale 46. As is well known to those versed in the art, the timer may be preset to time any elapsed time interval within the range of the scale 46 by rotating the knob 44 to the desired elapsed time setting. The knob then returns to its zero position at a timed rate such that the knob arrives at the zero position at the end of the preset elapsed time interval.

Inscribed or otherwise placed on the face plate 20 below each timer are indicia 48 representing a particular work operator. Indicia 48 representing successive work order numbers are inscribed or otherwise placed on the face plate along the left-hand ends of the horizontal rows 24 of face plate holes 22. At this point, it is worthy of note that the holes in the rows 24, 26 are staggered in such a way as to increase the number of horizontal rows.

The job pegs 28 are coded to represent different job operations. In the particular inventive embodiment illustrated, the pegs are color coded by constructing them of transparent plastic of different colors. Imprinted or inscribed on the front end faces of the pegs are indicia 50 representing different job completion times in selective time increments. The illustrated indicia, for example, represents time in half hour increments. Thus, a numeral, such as 9, represents the corresponding hours, i.e., the hour 9 or 9 o'clock. A numeral with a line under it, such as 8, represents the corresponding half hour, i.e., 8:30.

As noted earlier, the present work scheduling apparatus may be employed for many different applications, such as scheduling jobs in an automotive servicing and repair facility, scheduling runs in a trucking operation, scheduling the work of employees in factories, and many more.

The particular inventive embodiment shown is intended for scheduling service and repair work in an automotive service and repair facility. In this application, the face plate "operator" indicia 46 are mechanics' names. The job number indicia 48 are log numbers corresponding to those which are placed on the work order sheets which are completed for incominb customers and list the various servicing and/or repair operations desired by the customers as well as labor and parts costs and various other information.

The manner of using the work scheduling apparatus will now be described. The work scheduling board 12 is placed at the work scheduling station in a position where the board may be observed by the job scheduler or dispatcher. When each customer arrives, a work order or job sheet is prepared for him and assigned the next available job order or log numbers 48 on the board. The dispatcher then receives the sheet and notes the various jobs to be performed. Assuming that none of the mechanics have yet been assigned any work, the dispatcher selects the proper colored job pegs 28 representing the various jobs to be performed and the estimated completion times of the jobs. These pegs are then inserted into the proper face plate holes 22 along the horizontal row 24 designated by the corresponding log number at the vertical row or rows 26 headed by the name or names of the mechanics who are to perform the various jobs. The first job to be performed is then assigned to the appropriate mechanic, whereupon the dispatcher sets the corresponding timer 42 to the estimated time required to complete the job and depresses the corresponding peg 28 to illuminate the latter for indicating that the mechanic is engaged on a job.

After completion of the first job, as indicated by return of the corresponding timer 42 to zero, the second job is assigned to the appropriate mechanic. The lighted peg is removed from the board, and the peg corresponding to the next mechanic is depressed and lighted. The corresponding timer is set to the estimated completion time of the second job. This same procedure is followed for each successvie job on the work sheet and for the work sheet of each arriving customer. In this latter regard, it will be understood that a number of pegs will be placed in each mechanic's row 26 indicating successive jobs to be performed by him in the course of his work shift. Each successive peg is depressed and lighted when the mechanic completes his previous job, as indicated by the corresponding timer 42 and estimated job completion time on the previous peg. The timer is reset to the appropriate completion time when the mechanic commences each new job.

The particular work scheduling apparatus under discussion has an additional vertical row of holes 26a along the extreme right-hand edge of the scheduling board 12 and a set of pegs 52 to be inserted in the holes. As indicated by the legend at the top of the column, this row of holes and the pegs are used to designate the disposition of each customer's car. Referring to FIG. 8, it will be seen that the pegs bear the letters H, W, D and WC. These indicate various dispositions of customers' cars, as follows:

H - Hold for parts or overnight
W - Customer waiting
D - Deliver to customer
WC - Customer will call for car As each customer's log number 48 and job pegs 28 are entered on the board 12, the appropriate disposition peg 52 is also entered to indicate what disposition is to be made of the customer's car.

Figure 11:
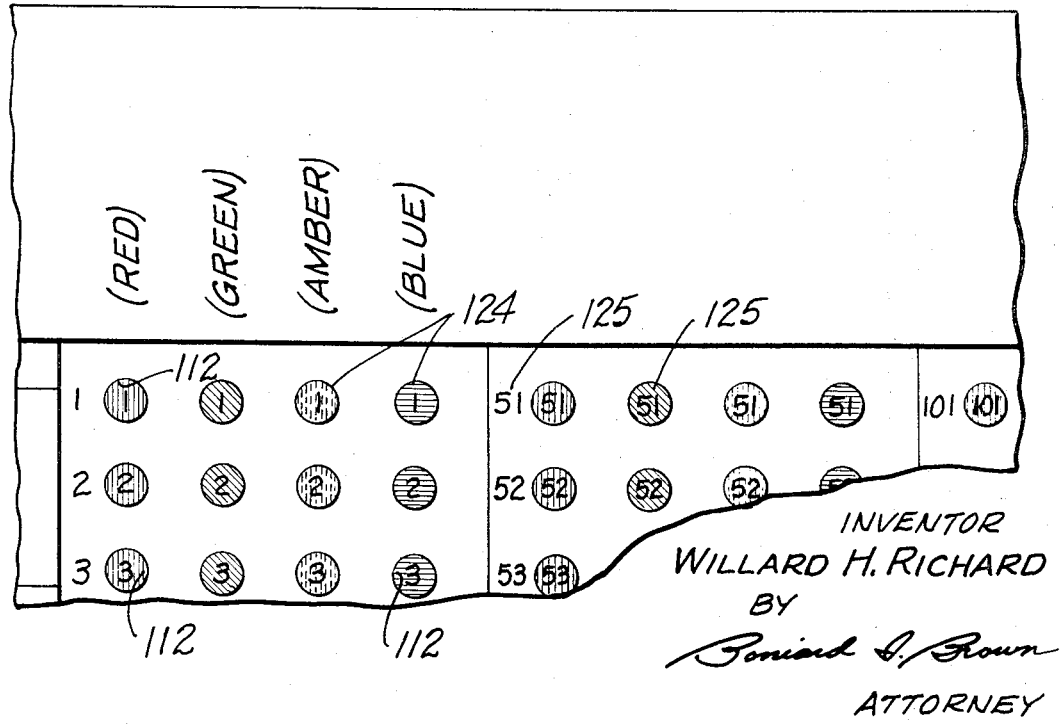
FIG. 11 is another fragmentary enlargement of the board illustrating the job pegs which are used on the board.

Attention is now directed to FIGS. 9–11 illustrating a modified work scheduling apparatus 100 according to the invention which is designed principally for automotive servicing and repair applications. Apparatus 100 has a work scheduling board 102 which is identical to the board 12 except for the arrangement of holes and the timing means on the board. Accordingly, it is unnecessary to describe the board in elaborate detail.

Suffice it to say that the face plate 104 of the board 102 has three groups 106, 108, 110 of holes 112 arranged in horizontal and vertical rows 114, 116. The horizontal rows 114 are designated by indicia 118 representing different mechanics, i.e., mechanics' names. The vertical rows within the hole group 108 are designated by indicia 120 representing successive clock times in selected time increments, in this instance half hour increments. These holes are work scheduling holes and define work scheduling positions on the board as in the earlier embodiment. The last four or so vertical rows 116 are "carry-over" rows for work which must be carried over from one day to the next. The number of these carry-over rows may be varied as desired.

The holes 112 within the first hole group 106 contain pegs 122 which are hereafter referred to in places as mechanics' indicator pegs and are identified in some way with the mechanics whose names appear in their respective horizontal rows 114. In the particular embodiment shown, the horizontal rows are numbered consecutively and the pegs bear the same numbers as their respective horizontal holes, as shown in FIG. 11. The holes in the last hole group 110 contain job pegs 124 which are color coded to represent different job operations like the pegs in the first described embodiment. In the particular embodiment under discussion, the horizontal rows of job pegs 124 are numbered consecutively at 125 and the job pegs, in addition to being color coded, bear the same number 125 as their respective horizontal rows. These numbers 125 are job or log numbers which are assigned to the customers and listed on their work sheet or job order, as explained earlier. The pegs 122, 124 are transparent like the pegs described earlier. Pegs 122 may be clear. Pegs 124 have different colors like the earlier job pegs.

At the top of the scheduling board 12 are an off-on switch 126, and indicator light 128, a half-hour light 130, and a time set knob 134. The off-on switch 126 controls electrical power to the board. When the switch is turned on, the indicator light 128 and peg illumination light are lighted. The time set knob 134 operates a switch controlled by a timing motor, such as a 1 RPH motor, which controls the half-hour light 132 to turn the latter on for a short period (i.e., from ½ minute to 1½ minutes) each half hour. The time set knob is adjustable to synchronize the on periods of the half-hour light with clock time. That is to say, the knob may be set to start the half-hour light at any selected shift start time, such as 7:30, 7:45, 8:00, etc.

In use, the board 102 is turned on at the start of the shift by means of the switch 126. The indicator pegs 122 and job pegs 124 are initially within the holes in their respective hole groups 106, 110, as shown. As each customer arrives, a job sheet is made out listing the next available log number 125 and the jobs to be performed on his car. The job pegs 124 bearing the customer's log number 125 are then inserted into the work scheduling holes in the hole group 108 at positions such that each peg is located in the horizontal row 114 of the proper mechanic and in the vertical row 116 representing the estimated completion time of the job. Simultaneously, one of the mechanic's indicator pegs 122 is placed in each hole in hole group 110 from which a job peg 124 is removed to indicate the mechanic currently working on the corresponding job. The pegs representing the jobs currently being worked by mechanics and the mechanic's indicator pegs in the hole group 110 are depressed and thereby illuminated, as before.

Periodically, at one-half hour intervals as indicated by the half-hour light 130, the dispatcher checks a job which fails to be completed by the estimated completion time on the board and the estimated completion time revised, if necessary. He then clears the job pegs 124 from the corresponding half-hour row 120 of the board and depresses the pegs, if any, in the next row to illuminate the latter pegs. The job pegs for any jobs which are completed ahead of schedule are removed upon job completion. The removed pegs are returned to their proper holes in the hole group 110 and the indicator pegs 122 in the latter holes are returned to their proper holes in the hole group 106. Referring particularly to FIG. 9, it will be seen that the top, center and bottom horizontal rows 114 on the scheduling board have holes 112 located at 15 minute intervals. These rows are used for relatively short time jobs, such as brake adjustments and the like.

At any time, the dispatcher may tell by a glance at the work scheduling board the status of any mechanic and whether he is occupied or available for a new job. Also the status of any customer's car may be determined by first determining his log number, then running down the holes in hole group 110 to that log number and noting the mechanic's indicator peg opposite the log number, and then going across the board to the proper horizontal mechanic's row 114 to find the job peg with the log number.

What is claimed as new in support of Letters Patent is:

1. In work scheduling apparatus of the class described, the combination comprising:
   a board having a front face and a multiplicity of holes entering said face and arranged in horizontal rows and vertical rows;
   a multiplicity of pegs selectively insertable into and removable from said holes, and
   said pegs being coded to represent different selected work operations.

2. The combination according to claim 1 wherein: said pegs have different colors representing different work operations.

3. The combination according to claim 1 including: means for selectively individually illuminating each peg on said board.

4. The combination according to claim 1 wherein: said pegs are transparent, and
   said apparatus comprises means for selectively individually illuminating each peg on said board from the rear of said board in a manner such that light is transmitted through each illuminated peg to permit observation of each illuminated peg from the front side of said board.

5. The combination according to claim 1 wherein: said pegs are transparent,
   said board comprises an opaque face plate containing said holes, a light shutter assembly at the rear of said face plate including normally closed shutter means opposite each hole, and a light source at the rear of said shutter assembly, and
   the shutter means opposite each hole containing a peg being adapted to be selectively opened to illuminate the contained peg from the rear in a manner such that light is transmitted through the peg to permit observation of each illuminated peg from the front side of said board.

6. The combination according to claim 5 wherein: each peg is movable in its containing hole between forward and rearward positions, and
   the shutter means opposite each hole containing a peg is opened by depressing the peg to its rearward position and closed by returning the peg to its forward position.

7. The combination according to claim 6 wherein:
   said shutter assembly comprises a transparent plate at the rear of and spaced from said face plate, and an opaque resilient compliant sheet between said plates having normally closed intersecting slits opposite said holes, respectively, and forming said shutter means,
   each peg on said board when in forward position has its rear end seating against the front side of said sheet, whereby the corresponding slits remain closed to block illumination of the peg, and
   each peg on said board being depressible to force the peg through the corresponding slits to a rearward position wherein the rear end of the peg seats against said transparent plate, whereby the peg is illuminated by said light source.

8. The combination according to claim 7 wherein: said pegs have different colors representing different work operations.

9. Work scheduling apparatus comprising:
   a board having a front face and a multiplicity of holes entering said face and arranged in a set of horizontal rows and a set of vertical rows,
   the rows of one row set being adapted to be assigned to different work orders and the rows of the other row set being adapted to be assigned to different work orders,
   work order identification indicia on said board associated with the rows, respectively, of said one row set,
   presettable timers on said board associated with the rows, respectively, of said other row set,
   a multiplicity of pegs selectively insertable into and removable from said holes,
   said pegs being coded to represent different selected work operations, and
   each peg having indicia representing a selected operation completion time.

10. Work scheduling apparatus according to claim 9 wherein:
    the rows of said one row set are said horizontal rows and the rows of said other row set are said vertical rows.

11. The combination according to claim 9 wherein: said pegs have different colors representing different work operations.

12. The combination according to claim 11 wherein: said pegs are transparent, and
    said apparatus comprises means for selectively individually illuminating each peg on said board from the rear of said board in a manner such that light is transmitted through each illuminated peg to permit observation of each illuminated peg from the front side of said board.

13. The combination according to claim 9 wherein: said pegs are transparent,
    said pegs have different colors representing different work operations,
    said board comprises an opaque face plate containing said holes, a light shutter assembly at the rear of said face plate including normally closed shutter means opposite each hole, and a light source at the rear of said shutter assembly, and
    the shutter means opposite each hole containing a peg being adapted to be selectively opened to illuminate the contained peg from the rear in a manner such that light is transmitted through the peg to permit observation of each illuminated peg from the front side of said board.

14. The combination according to claim 13 wherein:

each peg is movable in its containing hole between forward and rearward positions, and the shutter means opposite each hole containing a peg is opened by depressing the peg to its rearward position and closed by returning the peg to its forward position.

15. The combination according to claim 14 wherein:

said shutter assembly comprises a transparent plate at the rear of and spaced from said face plate, and an opaque resilient compliant sheet between said plates having normally closed intersecting slits opposite said holes, respectively, and forming said shutter means, each peg on said board when in forward position has its rear end seating against the front side of said sheet, whereby the corresponding slits remain closed to block illumination of the peg, and each peg on said board being depressible to force the peg through the corresponding slits to a rearward position wherein the rear end of the peg seats against said transparent plate, whereby the peg is illuminated by said light source.

16. Work scheduling apparatus according to claim 9 wherein:

said board includes an additional row of holes parallel to the rows of said other row set, and said apparatus includes pegs selectively insertable into the holes of said additional row and coded to represent different work product destinations.

17. Work scheduling apparatus comprising:

a board having a front face and a multiplicity of holes entering said face and arranged in a set of horizontal rows and a set of vertical rows, the rows of one row set being adapted to be assigned to different work operators and the successive rows of the other row set being adapted to be assigned to successive hourly times of the work shift, work operator identification indicia on said board associated with the rows, respectively, of said one row set, hourly time identification indicia on said board associated with the rows, respectively, of said other row set, a multiplicity of pegs selectively insertable into and removable from said holes, said pegs being coded to represent different selected work operations, and the pegs of each peg group having indicia representing the same work order and the pegs of the different peg groups having indicia representing different work orders.

* * * * *